3,104,520
TURBOSUPERCHARGER BYPASS EJECTOR
John M. Cazier, Los Angeles, Wilton E. Parker, Encino, and Alexander Silver, Woodland Hills, Calif., assignors to The Garrett Corporation, Los Angeles, Calif., a corporation of California
Filed Sept. 11, 1957, Ser. No. 683,351
3 Claims. (Cl. 60—13)

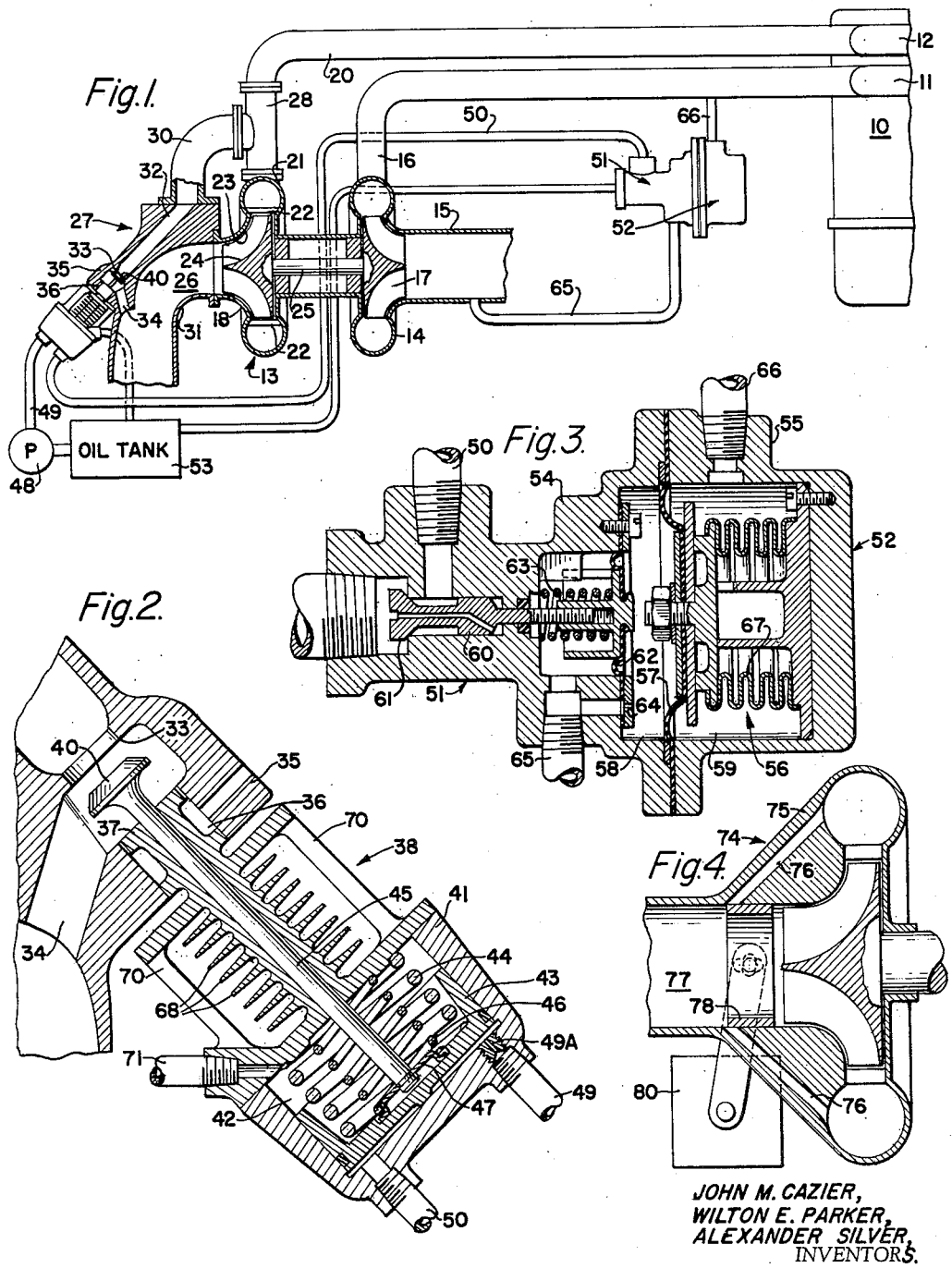

This invention relates generally to turbomachinery. It is particularly directed to engine supercharging apparatus of the type having a compressor driven by a turbine which is in turn operated by gases exhausted by an engine receiving compressed air from the compressor, the apparatus having a wastegate controlled by-pass for governing the operation of the turbine and consequently the compressor.

In the operation of supercharging apparatus of the type referred to above, considerable energy is contained in the by-passed exhaust gases. Ordinarily, this energy is wasted because it is conducted around the turbine and discharged directly to the atmosphere.

One of the objects of this invention is to provide a supercharging apparatus with means for utilizing the energy remaining in the by-passed exhaust gases and thus increase the efficiency of the apparatus.

More specifically, it is an object of this invention to provide an exhaust gas driven turbocharger with a by-pass having an ejector nozzle to direct the by-passed gases into the exhaust duct leading from the turbine, in such a manner as to induce a flow of fluid away from the turbine outlet whereby a more effective turbine pressure ratio for given values of engine exhaust and atmospheric pressures, will be secured. The engine equipped with the supercharger may, therefore, operate with improved efficiency and extended life. The control of the supercharger and consequently the engine is also made more flexible.

A further object of the invention is to provide a turbosupercharger having a wastegate valve for controlling the operation of the device and an ejector nozzle which utilizes by-passed gases to increase the efficiency of the turbocharger, the operation of the wastegate valve being governed by a pressure ratio control mechanism of the type illustrated in the co-pending application Serial No. 620,635, filed November 6, 1956, now abandoned, in the name of Alexander Silver, which mechanism is responsive to pressure differences between the inlet and outlet of the compressor portion of the supercharger; the ejector thus improves the operation of the turbocharger and the pressure ratio control mechanism maintains the operation at the improved stage by causing the proper amount of exhaust gases to be by-passed.

Further objects and advantages of the present invention will appear from the following description and the accompanying drawings in which apparatus embodying the invention has been illustrated in detail.

In the drawings:

FIG. 1 is a diagrammatic view of an engine supercharger provided with a by-pass ejector formed in accordance with the present invention;

FIG. 2 is a sectional view through the by-pass ejector on a larger scale;

FIG. 3 is a longitudinal sectional view of a pressure ratio control employed with the supercharger and by-pass ejector; and FIG. 4 is a diagrammatic view of a modified form of by-pass ejector embodying some of the principles of the invention.

Referring more particularly to FIG. 1 of the drawings, the numeral 10 designates an engine which may be of any type, such as a diesel engine, and provided with intake and exhaust manifolds 11 and 12, respectively. The numeral 13 designates generally, a turbosupercharger provided in connection with the engine 10 to supply induction air thereto. As is usual with turbosuperchargers, the device 13 has a compressor section 14 with an inlet 15 for atmospheric air and an outlet 16 which is connected with the intake manifold 11 of the engine 10.

The compressor also includes a rotor 17, the operation of which draws air through the inlet 15 and discharges it under pressure through the outlet 16 to the intake manifold 11. Supercharger 13 includes a turbine section 18 having an inlet pipe 20 which leads from the exhaust manifold 12 of the engine 10, to a gas distributing scroll 21 forming a part of the turbine casing and connected by nozzles 22 with the turbine wheel chamber 23. It will be obvious to those skilled in the art that there are turbines classed as "nozzle-less" types in which the gases flow directly from the scroll to the turbine wheel vanes. The chamber 23 receives the turbine wheel 24 which is connected by a shaft 25 with the impeller or rotor 17 of the compressor. An axial outlet 26 extends from the turbine housing to a point of discharge. It will be obvious from the foregoing that when the engine 10 is operated, exhaust gases will flow from the manifold 12, through the conduit 20, scroll 21 and nozzles 22 into passages formed in the turbine wheel 24 from which the gases will flow through the outlet conduit 26 to the point of discharge. This flow of gases through the wheel 24 causes the wheel to revolve at a rapid rate, this rotary motion being transmitted by the shaft 25 to the impeller 17 of the compressor. As the impeller 17 revolves, air is drawn through the inlet pipe 15 and discharged through the outlet pipe 16 to the intake manifold of the engine 10.

The foregoing description of the supercharger and its operation are believed to be clear and well known, and further elaboration, except where necessary to facilitate an understanding of the invention, will be omitted.

To control the operation of the supercharger, an exhaust gas by-passing mechanism has been provided. This exhaust gas by-passing mechanism is indicated generally by the numeral 27. It includes a fitting 28 which is connected in the conduit 20 and is provided with a branch 30 leading from the passage 20 in advance of the turbine 18. The outlet conduit 26 includes an elbow-shaped section 31 in which a portion of the by-pass passage is formed. This portion of the by-pass passage, designated by the numeral 32, communicates with the branch 30 and is provided with a valve seat indicated by the numeral 33. Another portion of the by-pass passage includes a jet-like nozzle 34 which is disposed at the downstream side of the seat 33 and opens into the interior of the elbow-shaped portion 31, the nozzle 34 being located substantially in registration with the outlet end of the elbow 31.

The elbow 31 has an external boss 35 in which an opening 36 is provided, this opening being in registration with the seat 33. Opening 36 is formed for the reception of a guide device 37 which constitutes a part of the actuator 38 for a valve 40, this valve being disposed for co-operation with the seat 33 to control the flow of gases through the by-pass passage, and consequently to control the rate of operation of the supercharger. It will be obvious that when the valve is spaced from the seat 33, gases will flow from the conduit 20 through the by-pass passage to the exhaust passage 26, rather than through the turbine, and thus the rate of operation of the turbine will be reduced.

One of the features of this invention is the provision of the nozzle 34 and its location so that gases discharging therefrom will induce a pressure reduction at the outlet side of the turbine. This pressure reduction causes a greater differential to exist across the turbine, thus increasing its efficiency. It is obvious that with this increased differential, the turbine will operate with less gas flowing therethrough and consequently the exhaust gases in the turbine inlet and exhaust manifold 12 will be at a lower pressure. The engine 10 will, therefore, be operated with increased efficiency, due to the lowered back pressure in the manifold 12.

The valve actuating mechanism 38 includes a body 41 which may be formed on or attached to the outer end of the guide frame 37 and provides a piston chamber 42. Chamber 42 slidably receives a piston 43 which is urged in one direction in the piston chamber 42 by a coil spring 44, this spring being disposed between the piston 43 and the end of the frame 37. Movement of the piston 43 is in opposition to the spring 44 is transmitted by a stem 45 to the valve 40 causing the latter member to engage the seat 33. When the valve is so engaged with the seat, gas flow through the by-pass passage is prevented, and all of the gas exhausting from the engine 10 will then flow through the turbine causing it to revolve at a maximum speed contingent upon the rate of operation of the engine 10. The valve 40 is also urged away from the seat by the pressure of the gases in the inlet end of the by-pass passage and by a relatively light coil spring 46 disposed between the outer portion of the guide device 37 and a spring adapter 47 secured to the outer end of the valve stem 45. The coil spring 46 maintains the adapter 47 in engagement with the central portion of the piston 43 and causes the valve 40 to move with and be controlled by the piston 43.

To effect a valve closing operation of the piston 43, fluid pressure is applied to the end opposite that engaged by the stem 45. In the form of the invention illustrated, oil from a suitably driven pump 48 is supplied to the outer end of the piston chamber 42 through a tube 49 and orifice 49A. To control the application of fluid pressure to the piston another tube 50 leads from the chamber 42 to a valve 51 forming a part of a pressure ratio control mechanism designated generally by the numeral 52. When the valve 51 is opened sufficiently, oil may flow from the chamber 42 to oil tank 53 at a faster rate than orifice 49A will permit it to flow into the chamber, therefore springs 44 and 46 will tend to maintain the piston in its outermost position in which valve 40 is open and permits exhaust gases to by-pass turbine 13. When valve 51 is closed sufficiently to prevent the flow of oil from chamber 42 as fast as it flows thereinto, the pressure in the outer portion of the chamber will increase and move piston 43 in a direction to close valve 40 thereby decreasing the volume of exhaust gases by-passed and increasing the rate of operation of the turbocharger.

In the operation of the turbocharger, high engine efficiency will be secured by maintaining a predetermined ratio between the pressure in the intake manifold and the ambient atmosphere. The pressure ratio control mechanism 52 has been provided to govern the operation of the by-pass valve 40 to secure this object. Mechanism 52 as shown in FIG. 3, includes a pair of body parts 54 and 55 which form diaphragm chamber 56, this chamber being divided by a diaphragm 57 into sections 58 and 59. Body part 54 includes the valve 51 which has a movable spool 60 with a poppet head 61 for co-operation with a seat in body part 54 to control fluid flow from chamber 42. Spool 60 is connected with a safety diaphragm 62 secured in body part 54, the diaphragm being normally urged in a direction to close valve 51 by a spring 63.

Diaphragm 62 divides chamber section 58 into two sections which communicate with one another through an orifice 64 and with the inlet 15 of the compressor through a passage 65. Chamber section 59 communicates through a passage 66 with the outlet duct 16 of the compressor 14. This chamber section contains an evacuated bellows 67 which is secured to the body part 55 and to one side of the diaphragm 57 and thus serves to limit the area of the diaphragm exposed to the compressor outlet pressure to a predetermined ratio relative to the area exposed to the compressor inlet or ambient pressure.

When engine 10 is not in operation and for a short period after operation is initiated, springs 44 and 46 will hold valve 40 open. During this time most of the exhaust gases will by-pass the turbine. Initial operation of pump 48, however, will apply fluid pressure to piston 43 and cause valve 40 to close, thus directing all the exhaust gases through the turbine until the compressor 14 delivers enough air to duct 16 to effect the operation of the ratio control mechanism. As pressure increases in duct 16 and in chamber section 59, diaphragm 57 will be urged toward chamber section 58 and the central portion of the diaphragm assembly will engage the central portion of the safety diaphragm assembly transmitting movement therethrough to the valve spool 60. When sufficient pressure exists in duct 16, valve spool 60 will open and permit fluid to bleed from piston chamber 42 to the tank 53. Increasing pressure in duct 16 and chamber section 59 increases the rate of fluid flow from chamber 42 and decreases the force applied to piston 43, thus permitting the latter to move valve 40 in an opening direction. As previously pointed out, the opening of valve 40 permits exhaust gases to by-pass the turbine to control the speed of operation of the compressor. The gases being by-passed issue from the jet nozzle 34 and induce a flow through the turbine outlet producing a reduced pressure therein.

At low engine speeds and low torque requirements, the compressor outlet pressure will tend to fall. Since this pressure is sensed in chamber 59, diaphragm 57 will start to move toward chamber 59, permitting spring 63 to move valve 60 toward a closed position. Flow of hydraulic fluid from the piston chamber 42 will thus be obstructed, causing a force to be applied to piston 43 to move bypass valve 40 toward a closed position. More exhaust gases will then be directed through the turbine 18 to increase the rate of operation of the compressor and maintain the intake manifold pressure. The turbocharger is thus effective at low engine speed and low torque requirements.

When the engine speeds and torque requirements are increased, the turbine speed will tend to increase due to the increase in exhaust gas volume and pressure and the increase in compressor output will increase the pressure in the intake manifold. This pressure increase will be reflected in chamber 59 of the pressure ratio control mechanism, causing the diaphragm to start to move away from chamber 59, thus moving valve 60 toward open position. Flow of hydraulic fluid through line 50 may then increase, reducing the force applied to piston 43. Springs 44 and 46 will move valve 40 toward open position to permit more exhaust gases to flow through the bypass. As these gases flow from the nozzle 34, a reduced pressure will be induced at the outlet of turbine 18, as previously described, and the optimum pressure ratio across the turbine will be secured with a lower back pressure in the exhaust manifold 12. The exhaust ejector increases the overall efficiency of the power plant at higher engine speeds and torque requirements by utilizing the energy in the by-passed exhaust gas to lower the back pressure in exhaust manifold. In previous bypass systems the energy in the by-passed exhaust gas was wasted, thereby lowering the overall efficiency of the power plant.

As pointed out in the above-mentioned co-pending application, the pressure ratio control mechanism maintains the desired compressor outlet to inlet pressure ratio during barometric pressure changes such as those occurring when a vehicle travels from sea level to or over a mountainous route.

The diaphragm 62 and orifice 64 function, in the event main diaphragm 57 should fail, to move the spool 60 to an open position, and thus cause valve 40 to open. Diaphragm 62 therefore gives the device a "fail-safe" characteristic.

To insulate and protect the valve actuating mechanism disposed in the body 41, the guide frame 37 is formed with spaced radiating fins 68 and longitudinally extending bars 70. These elements will reduce the transfer of heat by conduction from the turbine exhaust duct to the body 41.

A duct 71 connects the spring containing portion of piston chamber 42 with tank 53 to vent leakage past the piston and permit movement of the latter.

In FIG. 4, a modified form of by-pass ejector mechanism 74 has been shown. Mechanism 74 includes a special housing 75 for the turbine wheel. In the housing 75 an annular by-pass passage, or a plurality of passage sections 76 extend from the annular gas manifold to the exhaust passage 77 at the outlet side of the turbine wheel. A sleeve valve element 78 is disposed for movement in the housing 75 at the point of communication between the by-pass passages and the exhaust passage. A suitable actuator, indicated by the block 80 is provided to effect the movement of the sleeve element 78 which functions as the valve and varies the area of the ejector nozzle. It will be seen that when the element 78 has been moved to a position to permit gas flow through the by-pass, an aspirating jet action will result and reduced pressure at the outlet side of the turbine will be induced. Gas flow through the by-pass 76 may be throttled by the movement of the sleeve.

In both forms of the invention, valve means are provided to control the flow of exhaust gases through a passage which by-passes the turbine of a supercharger. The gases permitted to flow through the by-pass passage are discharged in the form of a jet, into the outlet of the turbine to induce a flow through the turbine and thus increase the efficiency thereof.

The "fail-safe" characteristic of the control mechanism provided by diaphragm 62 and orifice 64 has previously been pointed out. Attention is also directed to other "fail safe" features. For example, if bellows 67 should fracture or leak, diaphragm 57 will readily move under compressor output pressure, to open valve 51, thus venting piston chamber 42 and permitting opening movement of valve 40. If spool 60 should be blocked open, the same action will result. If either of lines 49 or 50 develop unusual leaks, pressure in the outer end of piston chamber 42 will fall and springs 44 and 46 will move valve 40 to an open position. Undue leakage past piston 43 will equalize pressure at opposite ends of piston 43 permitting springs 44 and 46 to open the valve. Since valve 40 is disposed at the outlet side of seat 33, the pressure of the exhaust gas also tends to move the valve toward open position.

We claim:

1. In an engine supercharger of the type having an exhaust gas driven turbine and a compressor driven by the turbine, turbine inlet means for carrying exhaust gas under pressure substantially equal to the turbine inlet manifold pressure, aperture means in said turbine inlet means operative to bleed turbine inlet gas at said pressure, turbine exhaust duct means having an outlet end discharging to the atmosphere, by-pass duct means connecting the aperture means to the exhaust duct, means forming a terminal constriction of the by-pass duct of small area relative to its up-stream end and operative in dependency on turbine inlet gas at said pressure to form a high velocity stream of said gas in the exhaust duct directed substantially in registration with its outlet end, and means for controlling turbine inlet gas flow through the by-pass duct.

2. In an engine supercharger of the type having an exhaust gas driven turbine and a compressor driven by the turbine, turbine inlet means for carrying exhaust gas under pressure substantially equal to the turbine inlet manifold pressure, aperture means in said turbine inlet means operative to bleed turbine inlet gas at said pressure, turbine exhaust duct means having an outlet end discharging to the atmosphere, by-pass duct means connecting the aperture means to the exhaust duct, an ejector nozzle forming a terminal constriction of the by-pass duct of small area relative to its upstream end and operative in dependency on turbine inlet gas at said pressure to form a high velocity stream of said gas in the exhaust duct directed substantially in registration with its outlet end, and means for controlling turbine inlet gas flow through the by-pass duct.

3. In an engine supercharger of the type having an exhaust gas driven turbine and a compressor driven by the turbine, turbine inlet means for carrying exhaust gas under pressure substantially equal to the turbine inlet manifold pressure, aperture means in said turbine inlet means operative to bleed turbine inlet gas at said pressure, turbine exhaust duct means having an outlet end discharging to the atmosphere, by-pass duct means connecting the aperture means to the exhaust duct, an ejector nozzle forming a terminal constriction of the by-pass duct of small area relative to its upstream end and operative in dependency on turbine inlet gas at said pressure to form a high velocity stream of said gas in the exhaust duct directed substantially in registration with its outlet end, and valve means in said by-pass duct operable to control inlet gas flow therethrough.

References Cited in the file of this patent

UNITED STATES PATENTS

| | | |
|---|---|---|
| 1,082,113 | Diden | Dec. 23, 1913 |
| 1,172,450 | Griffin | Feb. 22, 1916 |
| 2,011,420 | Samuelson | Aug. 13, 1935 |
| 2,485,655 | Polk | Oct. 25, 1949 |
| 2,567,486 | Johansson | Sept. 11, 1951 |
| 2,833,355 | Reggio | May 6, 1958 |

FOREIGN PATENTS

| | | |
|---|---|---|
| 1,132,837 | France | Nov. 5, 1956 |
| 720,644 | Great Britain | Dec. 22, 1954 |